United States Patent
Yamada

(10) Patent No.: US 9,917,974 B2
(45) Date of Patent: Mar. 13, 2018

(54) RECORDING MEDIUM AND INFORMATION PROCESSING UNIT

(71) Applicant: Oki Data Corporation, Tokyo (JP)

(72) Inventor: Hironobu Yamada, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/297,385

(22) Filed: Oct. 19, 2016

(65) Prior Publication Data

US 2017/0149998 A1 May 25, 2017

(30) Foreign Application Priority Data

Nov. 25, 2015 (JP) .................................. 2015-229332

(51) Int. Cl.
*H04N 1/23* (2006.01)
*G06K 15/02* (2006.01)
*G03G 15/00* (2006.01)

(52) U.S. Cl.
CPC ....... *H04N 1/2384* (2013.01); *G03G 15/5016* (2013.01); *G06K 15/024* (2013.01); *G06K 15/028* (2013.01); *H04N 1/2323* (2013.01)

(58) Field of Classification Search
CPC combination set(s) only.
See application file for complete search history.

(56) References Cited

U.S. PATENT DOCUMENTS

| 6,408,132 | B1 * | 6/2002 | Ishikawa | G03D 15/001 396/2 |
| 2002/0086128 | A1 * | 7/2002 | Hirasawa | B32B 7/06 428/42.3 |
| 2005/0025924 | A1 * | 2/2005 | Toyama | B32B 27/36 428/40.1 |
| 2006/0274353 | A1 * | 12/2006 | Nemoto | G03G 21/02 358/1.14 |
| 2013/0169976 | A1 * | 7/2013 | Yamada | G06F 3/1204 358/1.2 |

FOREIGN PATENT DOCUMENTS

JP 2000326531 A 11/2000

\* cited by examiner

*Primary Examiner* — Clayton E Laballe
*Assistant Examiner* — Jas Sanghera
(74) *Attorney, Agent, or Firm* — Panitch Schwarze Belisario & Nadel LLP

(57) ABSTRACT

There is provided a recording medium having a printer driver embodied therein, the printer driver causing, when executed by a processor, the processor to implement a method. The method includes: receiving, with the processor, an input of information that includes an instruction on setting a first region; and generating, with the processor, frame data that includes a first frame and an instruction marker. The first region is included in a medium region that corresponds to a print medium. The first frame surrounds the first region. The instruction marker is adapted to give an instruction on setting a position of the first frame in the medium region.

12 Claims, 12 Drawing Sheets

RECORDING MEDIUM AND INFORMATION PROCESSING UNIT

CROSS REFERENCE TO RELATED APPLICATIONS

This application claims the benefit of Japanese Priority Patent Application JP 2015-229332 filed on Nov. 25, 2015, the entire contents of which are incorporated herein by reference.

BACKGROUND

The invention relates to a recording medium having a printer driver embodied therein that performs printing setting and generates print data, and to an information processing unit that performs printing setting and generates print data.

An image firming apparatus often performs marginless printing. For example, Japanese Unexamined Patent Application Publication No. 2000-326531 discloses a thermal transfer recording apparatus that so performs printing on a print medium provided with perforations on both sides thereof in a conveying direction that the printing is performed not only in a region sandwiched by the perforations but also to outside of the region sandwiched by the perforations. A user cuts off ends of the print medium along the perforations of the print medium that has been subjected to the printing. The thermal transfer recording apparatus thus achieves marginless printing.

SUMMARY

In a case where ends of a print medium are to be cut off after printing is performed on the print medium, it is necessary for a user to take into consideration a region to be cut off in advance while designing an image to be printed. This may make it difficult to design contents.

It is desirable to provide a recording medium having a printer driver embedded therein and an information processing unit that achieve easier designing of an image to be printed in a case of performing marginless printing.

According to one embodiment of the invention, there is provided a recording medium having a printer driver embodied therein, the printer driver causing, when executed by a processor, the processor to implement a method. The method includes: receiving, with the processor, an input of information that includes an instruction on setting a first region and generating, with the processor, frame data that includes a first frame and an instruction marker. The first region is included in a medium region that corresponds to a print medium. The first frame surrounds the first region. The instruction marker is adapted to give an instruction on setting a position of the first frame in the medium region.

According to one embodiment of the invention, there is provided an information processing unit including a processor that receives an input of information that includes an instruction on setting a first region, and generates frame data that includes a first frame and an instruction marker. The first region is included in a medium region that corresponds to a print medium. The first frame surrounds the first region. The instruction marker is adapted to give an instruction on setting a position of the first frame in the medium region.

DETAILED DESCRIPTION

Some example embodiments of the invention are described below in detail with reference to the drawings. The description is given in the following order.

1. First Example Embodiment
2. Second Example Embodiment

1. FIRST EXAMPLE EMBODIMENT

Configuration Example

Figure 1:
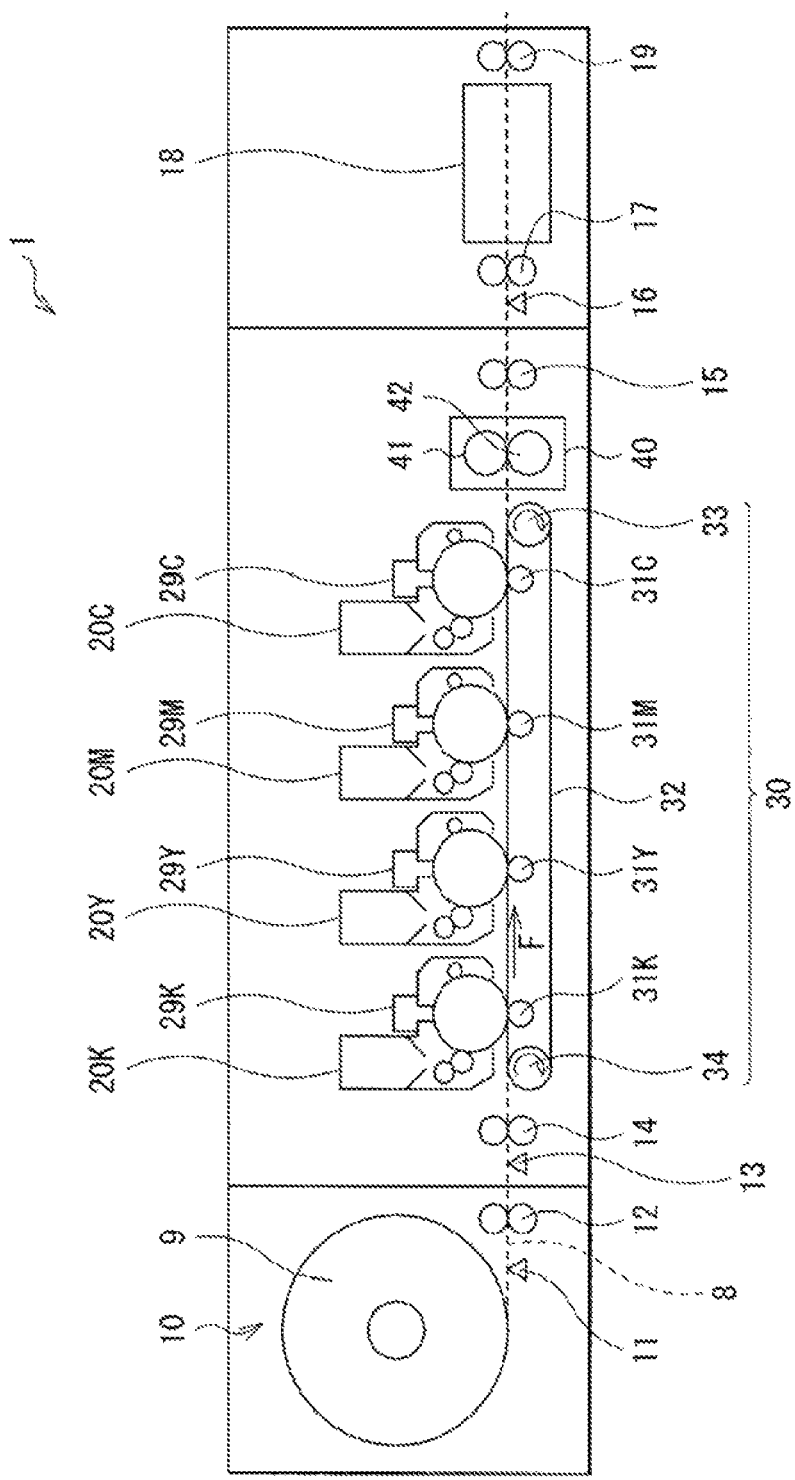
FIG. 1 is a configuration diagram illustrating a configuration example of an image forming apparatus.

FIG. 1 illustrates a configuration example of an image forming apparatus that is controlled using a printer driver according to a first example embodiment of the invention. An image forming apparatus 1 may serve as a printer that forms an image on a print medium by an electrophotographic method. The print medium may be a roll of sheet, for example. The image forming apparatus 1 may include a roll sheet feeder 10, a sensor 11, a conveying roller 12, a sensor 13, a conveying roller 14, four image drum (ID) units 20 (20K, 20Y, 20M, and 20C) four exposure units 29 (29K, 29Y, 29M, and 29C), a transferring unit 30, a fixing unit 40, a conveying roller 15, a sensor 16, a conveying roller 17, a cutter 18, and a discharging roller 19.

The roll sheet feeder 10 may be provided with the print medium 9 that is the roll of sheet set therein. The print medium 9 may be a print medium that is used for producing a label. The image forming apparatus 1 may have a configuration in which the cutter 18 cuts out the label of the print medium 9 to thereby produce the label as described later.

The sensor 11 may be a sensor that detects feeding of the print medium 9 from the roll sheet feeder 10 to a conveying path 8. The conveying roller 12 may include a pair of rollers that sandwich the conveying path 8 in between. The conveying roller 12 may so convey the print medium 9 that the print medium 9 fed from the roll sheet feeder 10 arrives at an appropriate position at appropriate timing.

The sensor 13 may be a sensor that detects passing of the print medium 9. The conveying roller 14 may include a pair of rollers that sandwich the conveying path 8 in between. The conveying roller 14 may convey the print medium 9 along the conveying path 8.

The four ID units 20 may each form a toner image. More specifically, the ID unit 20K may form a black toner image. The ID unit 20Y may form a yellow toner image. The ID unit 20M may form a magenta toner image. The ID unit 20C may form a cyan toner image. The four ID units 20 may be arranged in order of the ID units 20K, 20Y, 20M, and 20C in a conveying direction F of the print medium 9.

Figure 2:
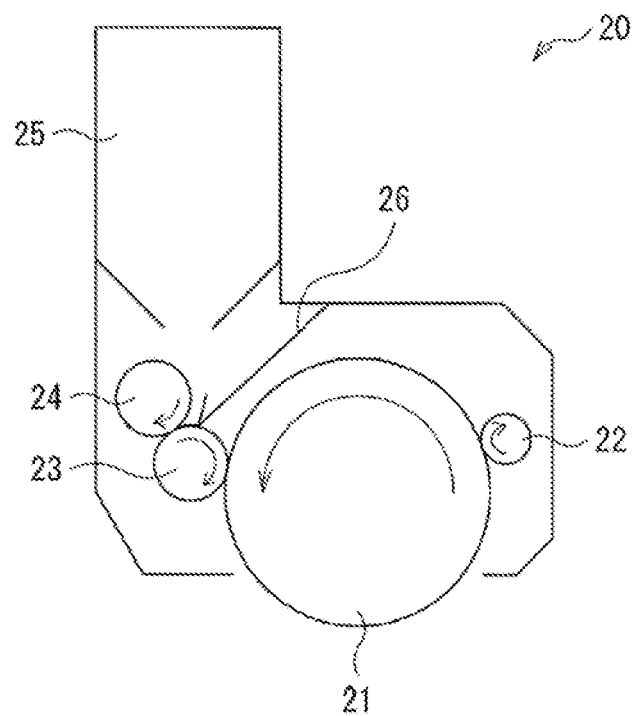
FIG. 2 is a diagram for explaining a configuration example of an ID unit illustrated in FIG. 1.

FIG. 2 illustrates a configuration example of the ID unit 20. The ID unit 20 may include a photosensitive member 21, an electrically-charging roller 22, a developing roller 23, a feeding miler 24, a toner container 25, and a toner blade 26.

The photosensitive member 21 may be a member having a surface (a surficial part) that supports an electrostatic latent image thereon. The photosensitive member 21 may be rotated counterclockwise in the present example embodiment by power transmitted from an unillustrated photosensitive member motor. The photosensitive member 21 may be electrically charged by the electrically-charging roller 22. The photosensitive member 21 in the ID unit 20K may be exposed by the exposure unit 29K. The photosensitive member 21 in the ID unit 20Y may be exposed by the exposure unit 29Y. The photosensitive member 21 in the ID unit 20M may be exposed by the exposure unit 29M. The photosensitive member 21 in the ID unit 20C may be exposed by the exposure unit 29C. The electrostatic latent image may be thus formed on the surface of each of the photosensitive members 21. Further, toner may be fed by the developing roller 23. The toner image in accordance with the electrostatic latent image may be thereby formed on each of the photosensitive members 21.

The electrically-charging roller 22 may be a member that electrically charges the surface (the surficial part) of the photosensitive member 21. The electrically-charging roller 22 may be so provided as to be in contact with a surface (a peripheral surface) of the photosensitive member 21. The electrically-charging roller 22 may be rotated clockwise in the present example embodiment, in accordance with rotation of the photosensitive member 21. The electrically-charging roller 22 may receive an electrically-charging voltage from an unillustrated power unit.

The developing roller 23 may be a member that has a surface supporting electrically-charged toner thereon, and feeds the attached toner to the photosensitive member 21. The developing roller 23 may be so provided as to be in contact with the surface (the peripheral surface) of the photosensitive member 21. The developing roller 23 may be rotated clockwise in the present example embodiment by power transmitted from an unillustrated photosensitive member motor. The developing roller 23 may receive a developing voltage from the unillustrated power unit.

The feeding roller 24 may be a member that electrically charges the toner stored inside the toner container 25, and feeds the toner stored inside the toner container 25 to the developing roller 23. The feeding roller 24 may be so provided as to be in contact with a surface (a peripheral surface) of the developing roller 23. The feeding roller 24 may be rotated clockwise in the present example embodiment by power transmitted from an unillustrated photosensitive member motor. This may generate friction between a surface of the feeding roller 24 and the surface of the developing roller 23 in each of the ID units 20. Accordingly, the toner may be electrically charged due to so-called triboelectric charging in each of the ID units 20. The feeding roller 24 may receive a feed voltage from the unillustrated power unit.

The toner container 25 may store the toner therein. More specifically, the toner container 25 in the ID unit 20K may store black toner. The toner container 25 in the ID unit 20Y may store yellow toner. The toner container 25 in the ID unit 20M may store magenta toner. The toner container 25 in the ID unit 20C may store cyan toner.

The toner blade 26 may be a member that is in contact with a surface of the developing roller 23, thereby forming a layer made of the toner (a toner layer) on the surface of the developing roller 23 and regulating (controlling or adjusting) thickness of the toner layer to be formed. The toner blade 26 may be a plate-like elastic member (a plate spring) that is made of a material such as stainless steel. The toner blade 26 may be so provided that a tip of the toner blade 26 is in contact with the surface of the developing roller 23. The toner blade 26 may receive a feed voltage from the unillustrated power unit.

The four exposure units 29 illustrated in FIG. 1 may each be a member that irradiates the photosensitive member 21 in each of the four ID units 20 with light. More specifically, the exposure unit 29K may irradiate the photosensitive member 21 in the ID unit 20K with light. The exposure unit 29Y may be a member that irradiates the photosensitive member 21 in the ID unit 20Y with light. The exposure unit 29M may irradiate the photosensitive member 21 in the ID unit 20M with light. The exposure unit 29C may irradiate the photosensitive member 21 in the ID unit 20C with light. Accordingly, each of the foregoing photosensitive members 21 may be exposed by corresponding one of the exposure units 29. The electrostatic latent image may be thus formed on the surface of each of the photosensitive members 21.

The transferring unit 30 may be a member that transfers each of the toner images formed by the four ID units 20K, 20Y, 20M, and 20C onto a targeted surface of the print medium 9. The transferring unit 30 may include transferring rollers 31K, 31Y, 31M, and 31C, a transferring belt 32, a driving roller 33, and a driven roller 34.

The transferring roller 31K may face the photosensitive member 21 in the ID unit 20K with the conveying path 8 in between. The transferring roller 31Y may face the photosensitive member 21 in the D) unit 20Y with the conveying path 8 in between. The transferring roller 31M may face the photosensitive member 21 in the ID unit 20M with the conveying path 8 in between. The transferring roller 31C may face the photosensitive member 21 in the ID unit 20C with the conveying path 8 in between. The transferring rollers 31K, 31Y, 31M, and 31C may each receive a transfer voltage from the unillustrated power unit.

The transferring belt 32 may convey the print medium 9 along the conveying path 8. The transferring belt 32 may be stretched by the driving roller 33 and the driven roller 34. In other words, the transferring belt 32 may lie from the driving roller 33 to the driven roller 34 while being stretched. Further, the transferring belt 32 may be rotated circularly in the conveying direction F in accordance with rotation of the driving roller 33. Upon being rotated in such a manner, the transferring belt 32 may travel between the ID unit 20K and the transferring roller 31K, between the ID unit 20Y and the transferring roller 31Y, between the ID unit 20M and the transferring roller 31M, and between the ID unit 20C and the transferring roller 31C.

The driving roller 33 may circularly rotate the transferring belt 32. In the present example embodiment, the driving roller 33 may be provided downstream from the four ID units 20 in the conveying direction F. The driving roller 33 may be rotated clockwise in the present example embodiment by power transmitted from an unillustrated belt motor. The driving roller 33 may thus rotate the transferring belt 32 circularly in the conveying direction F.

The driven roller 34 may be rotated clockwise in the present example embodiment in accordance with the circular rotation of the transferring belt 32. In the present example embodiment, the driven roller 34 may be provided upstream from the four ID units 20 in the conveying direction F.

The fixing unit 40 may be a member that applies heat and pressure to the print medium 9 to thereby fix, on the print medium 9, the toner image that has been transferred onto the print medium 9. The fixing unit 40 may include a heating roller 41 and a pressurizing roller 42. The heating roller 41 may include inside a heater. The heating roller 41 may be a member that applies heat on the toner on the print medium 9. The pressurizing roller 42 may be so provided as to provide a pressurizing portion between the heating roller 41 and the pressurizing roller 42. The pressurizing roller 42 may be a member that applies pressure to the toner on the print medium 9. The fixing unit 40 may thus heat, melt, and pressurize the toner on the print medium 9. As a result, the toner images are fixed on the print medium 9.

The conveying roller 15 may include a pair of rollers that sandwich the conveying path 8 in between. The conveying roller 15 may convey, along the conveying path 8, the print medium 9 on which the toner image is fixed.

The sensor 16 may be a sensor that detects passing of the print medium 9. The conveying roller 17 may include a pair of rollers that sandwich the conveying path 8 in between. The conveying roller 17 may convey the print medium 9, fed from the conveying roller 15, to the cutter 18. The cutter 18 may cut out a piece having a predetermined shape of the print medium 9. The cutter 18 may be exchangeable. Using cutters having different cutting shapes achieves cutting out pieces having various shapes of the print medium 9. The discharging roller 19 may include a pair of rollers that sandwich the conveying path 8 in between. The discharging roller 19 may discharge the print medium 9 fed from the cutter 18.

Figure 3:
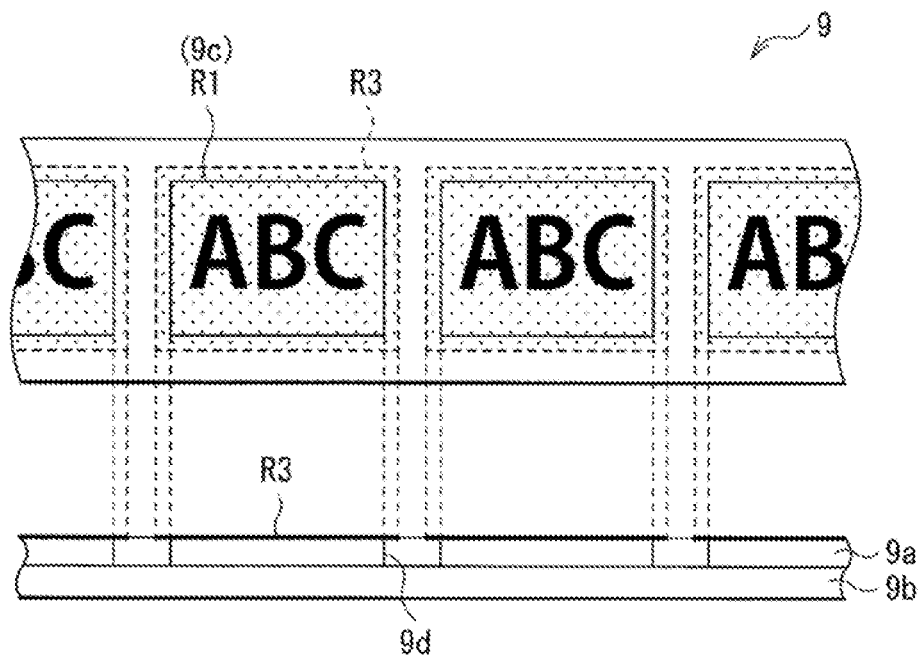
FIG. 3 is a diagram for explaining an operation example of the image forming apparatus illustrated in FIG. 1.

FIG. 3 illustrates a configuration example of the print medium 9 discharged from the image forming apparatus 1. The print medium 9 may include a label sheet 9a and a mount sheet 9b. A back surface of the mount sheet 9b may be provided with markers printed thereon in predetermined intervals. The image forming apparatus 1 may control a position of the print medium 9 in the conveying direction F using the markers. Further, a surface, of the label sheet 9a, on the mount sheet 9b side may be provided with glue. The label sheet 9a may be thereby attached to the mount sheet 9b. The image forming apparatus 1 may form an image in a printing region R3 on a surface of the label sheet 9a. Further, the cutter 18 may cut the label sheet 9a along a cutting surface 9d to thereby cut out a quadrangle piece of the label sheet 9a in the present example embodiment. Accordingly, the user may peel off the label 9c from the mount sheet 9b.

Upon forming an image, the image forming apparatus 1 may form the image in a region (the printing region R3) that includes a region of the label 9c (a label region R1) and is larger than the region of the label 9c (the label region R1). In other words, the image forming apparatus 1 may additionally color outside of the label region R1 to thereby form an image in the printing region R3 larger than the label region R1. This makes it possible to reduce possibility of occurrence of a non-printed region in the label region R1 even when the label region R1 is shifted from a desired position in the printing region R3.

Next, a description is given of a host computer 2 that may supply prim data DP to the image forming apparatus 1 thus configured.

Figure 4:
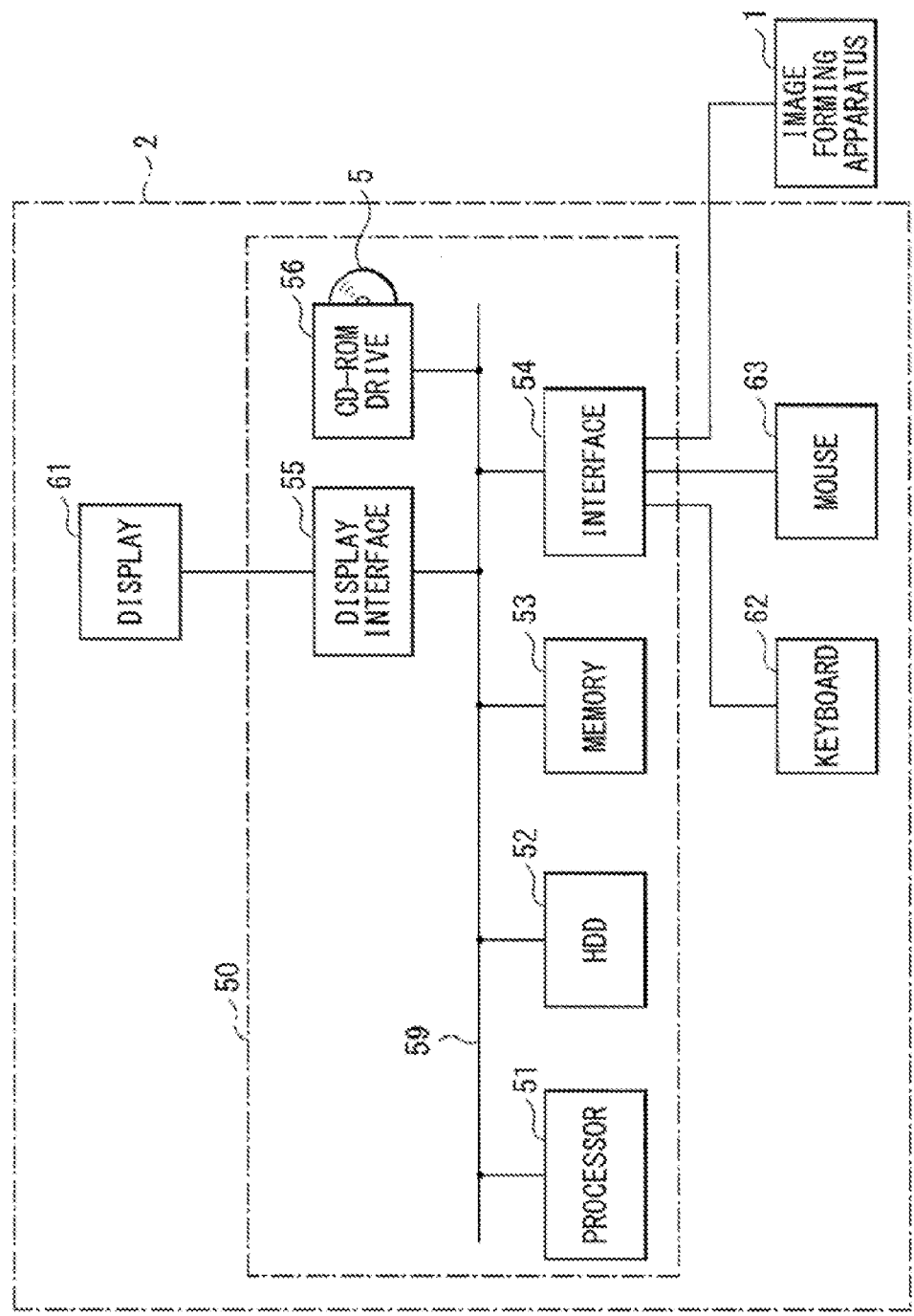
FIG. 4 is a block diagram illustrating a configuration example of a host computer that supplies print data to the image forming apparatus illustrated in FIG. 1.

FIG. 4 illustrates a configuration example of the host computer 2. The host computer 2 may be a so-called personal computer in the present example embodiment. The host computer 2 may include a computer body 50, a display 61, a keyboard 62, and a mouse 63 in the present example embodiment.

The computer body 50 may include a processor 51, a hard disk drive (HDD) 52, a memory 53, an interface 54, a display interface 55, and a compact disc read only memory (CD-ROM) drive 56. The processor 51 may include a central processing unit (CPU), for example. The processor 51 may execute various programs including an operating system 101 and application software 102 that are described later. The HDD 52 may store the various programs. The memory 53 may temporarily store information when the processor 51 performs processing. The interface 54 may be an interface that is provided to couple an external device to the computer body 50. In the present example embodiment, the computer body 50 may be coupled to the keyboard 62, the mouse 63, and the image forming apparatus 1 via the interface 54. The display interface 55 may be an interface that is provided to couple the display 61 to the computer body 50. The display interface 55 may supply an image signal to the display 61. The CD-ROM drive 56 may read data recorded in a CD-ROM 5. The processor 51, the HDD 52, the memory 53, the interface 54, and the display interface 55 may be coupled to each other via a bus 59.

The display 61 may display an image on the basis of the image signal supplied from the computer body 50. The keyboard 62 and the mouse 63 may be used by a user upon inputting information.

Figure 5:
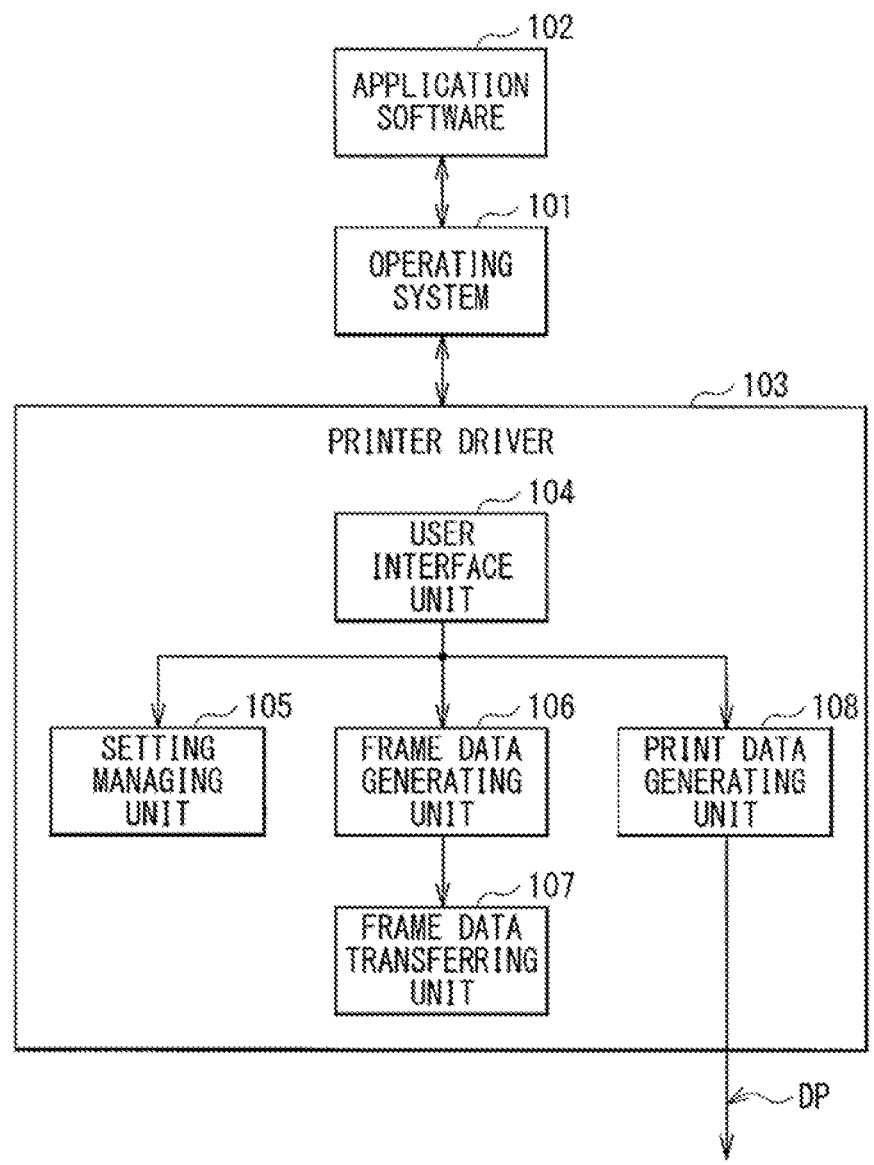
FIG. 5 is a diagram for explaining an example of a software configuration of a host computer according to a first example embodiment.

FIG. 5 illustrates an example of a software configuration of the host computer 2. In the present example embodiment, the operating system 101, the application software 102, and a printer driver 103 may be installed on the host computer 2.

The operating system 101 may be so-called basic software that controls operation of the host computer 2.

The application software 102 may be software such as image editing software, desk top publishing (DTP) software, and word processor software. The application software 102 may be used by the user to design the label 9c. The application software 102 may also generate a spooled file on the basis of data of the designed label 9c in response to printing instructions given by the user. Further, the application software 102 may supply the generated spooled file to the printer driver 103 via the operating system 101.

The printer driver 103 may be a so-called device driver that controls operation of the image forming apparatus 1. The printer driver 103 may be recorded in the CD-ROM 5, for example, and may be installed on the host computer 2 upon operation by the user. The printer driver 103 may include a user interface unit 4, a setting managing unit 5, a frame data generating unit 106, a frame data transferring unit 107, and a print data generating unit 108.

The user interface unit 104 may cause a printing setting screen to be displayed on the display 61 of the host computer 2. The printing setting screen may be of a graphical user interface (GUI). The user interface unit 104 may also perform various types of printing setting in response to reception of the instructions from the user via the keyboard 62 and the mouse 63.

Figure 6:
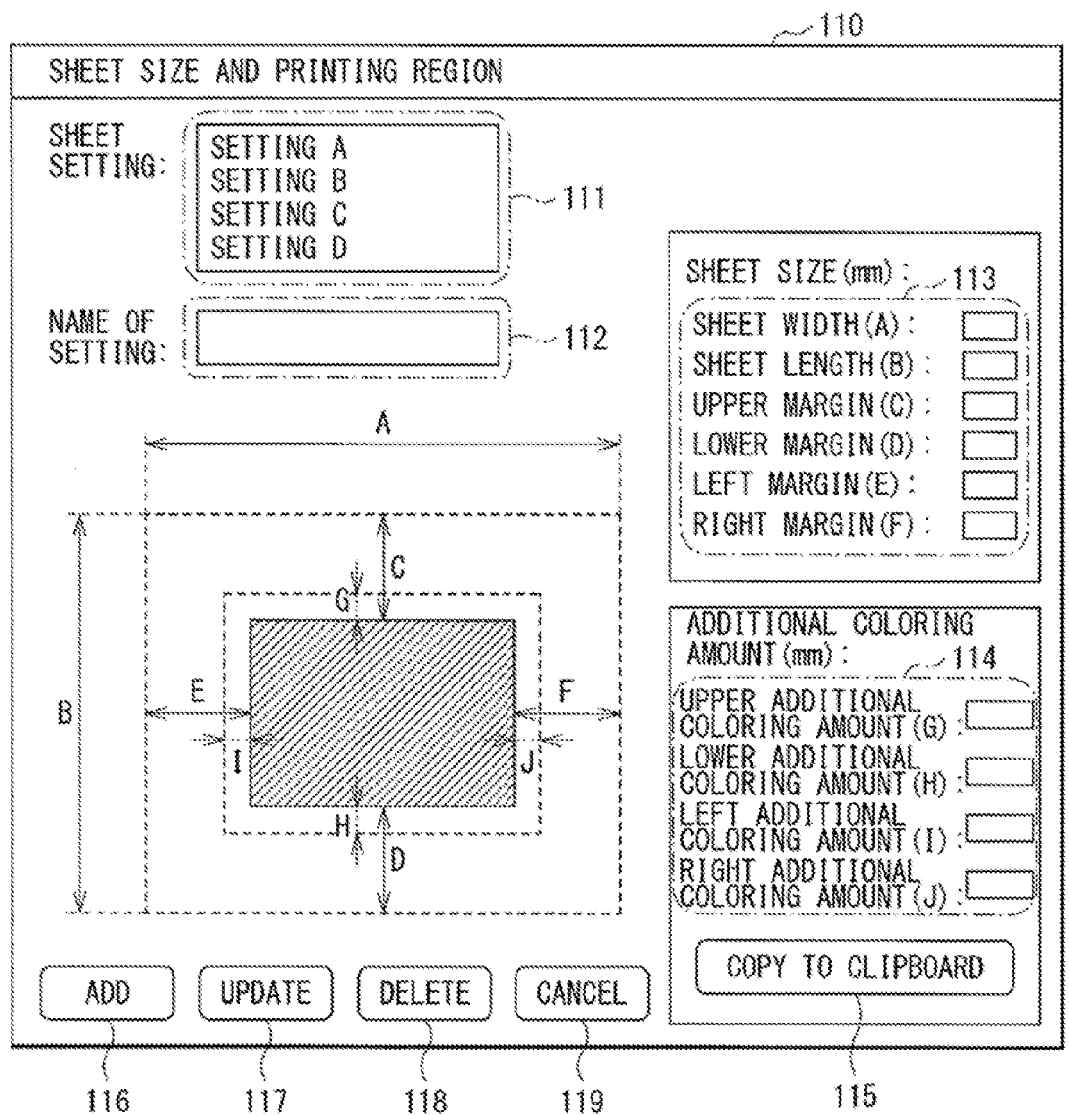
FIG. 6 is a diagram for explaining an example of a screen according to a printer diver illustrated in FIG. 5.

FIG. 6 illustrates an example of the printing setting screen. FIG. 6 illustrates an example of a screen 110 that is used to set the size of sheet and the printing region. The screen 110 may include a setting selection part 111, a setting name input part 112, a sheet size input part 113, an additional coloring amount input part 114, a copy button 115, an addition button 116, an update button 117, a delete button 118, and a cancel button 119.

Referring to FIG. 6, the setting selection part 111 may display a list of names of settings managed by the setting managing unit 105. The names of the settings may be "Setting A" to "Setting D" in the present example embodiment. The setting selection part 111 may be also provided for the user to select the setting which the user wants to revise. The setting name input part 112 may be provided to input the name of a setting when the user additionally creates the setting.

The sheet size input part 113 may be provided to input the width of sheet, the length of sheet, and margins on the upper side, the lower side, the left side, and the right side of the label region R1. More specifically, the user may input values based on the size of the print medium 9 to be used, in respective fields for the width of sheet and the length of sheet. The width of sheet may be the length of the print medium 9 in the conveying direction F, and the length of sheet may be the length of the print medium 9 in a direction intersecting with the conveying direction F. The width of sheet may be defined by positions of the markers printed on the back surface of the mount sheet 9b, for example. Further, the user may input values based on the position and the size of the region (the label region R1) to be cut out by the cutter 18 in fields for margins. It is to be noted that a shaded region in FIG. 6 indicates the label region R1.

The additional coloring amount input part 114 may be provided to input an amount by which additional coloring is performed on outside of the label region R1. More specifically, the user may input values based on a shift amount of the position of the print medium 9 depending on accuracy, of the image forming apparatus 1, in conveying the print medium 9. Decreasing the foregoing values may allow for reduction in the area of the printing region R3. This suppresses an amount of the toner to be used.

The copy button 115 may be provided to generate frame data DF described later on the basis of a result of the setting, and to copy the generated frame data DF to a clipboard 53A. The clipboard 53A may be an example of the memory 53 managed by the operating system 101.

The addition button 116 may be provided to add a new setting to database. The update button 117 may be provided to update the setting that has been already registered. The delete button 118 may be provided to delete, from the database, a setting selected by the user using the setting selection part 111. The cancel button 119 may be provided to terminate the operation without performing the setting.

The setting managing unit 105 illustrated in FIG. 5 may manage the setting inputted by the user using the screen 110 illustrated in FIG. 6. More specifically, for example, when the user operates the addition button 116, the setting managing unit 105 may add a new setting to the database. When the user operates the update button 117, the setting managing unit 105 may update the setting that has been already registered. When the user operates the delete button 118, the setting managing unit 105 may delete, from the database, the setting selected by the user using the setting selection part 111.

The frame data generating unit 106 may generate the frame data DF on the basis of the result of the setting set using the screen 110 illustrated in FIG. 6, when the user operates the copy button 115.

Figure 7:
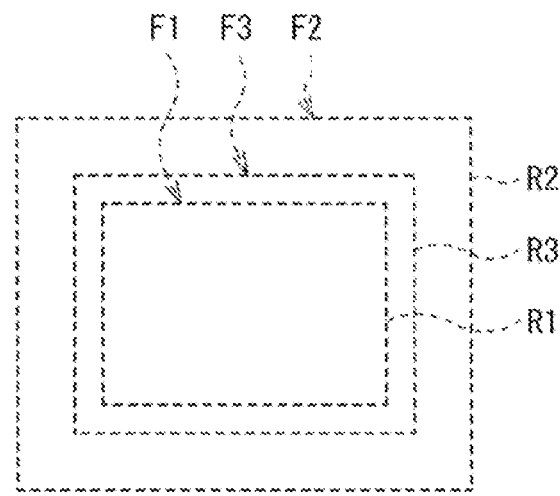
FIG. 7 is a diagram for explaining an example of frame data generated by the printer driver illustrated in FIG. 5.

FIG. 7 illustrates an example of the frame data DF. The frame data DF may be metadata, for example. The frame data DF may include frames F1 to F3. The frame F1 is a frame that surrounds the label region R1. The frame data generating unit 106 may set the frame F1 on the basis of the values inputted by the user using the sheet size input part 113. The frame F2 may be a frame that surrounds a printable region R2 that is calculated on the basis of the size of sheet. The printable region R2 may be a region, in a region of the sheet, excluding the vicinity of ends of the sheet in which the image forming apparatus 1 is not allowed to perform printing. The frame data generating unit 106 may have information in advance about the width, from the end of the print medium 9, of a region in which printing is not allowed to be performed. The frame data generating unit 106 may set the frame F2 on the basis of the forgoing width and the values inputted by the user using the sheet size input part 113. The frame F3 may be a frame that surrounds the printing region R3. The frame data generating unit 106 may set the frame F3 on the basis of the values inputted by the user using the sheet size input part 113 and the additional coloring amount input part 114. The frame data generating unit 106 may generate the frame data DF including the frames F1 to F3 described above. It is to be noted that, although the present example embodiment uses the metadata, this is not limitative, and image data that is transparent except for the frames may be used instead, for example.

The frame data transferring unit 107 may transfer the flame data DF generated by the frame data generating unit 106 to the clipboard 53A.

Figure 8:
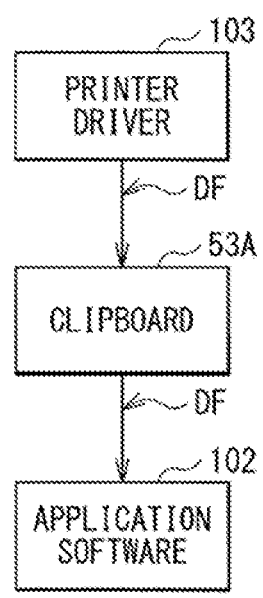
FIG. 8 is a diagram for explaining an operation example of a frame data transferring unit illustrated in FIG. 5.

FIG. 8 illustrates transfer of the frame data DF. When the frame data DF is generated in response to operation performed on the copy button 115 by the user, the frame data transferring unit 107 may transfer the generated frame data DF to the clipboard 53A. Thereafter, in response to so-called paste operation performed by the user, the application software 102 may cause the frames F1 to F3 to be displayed on a display screen of the display 61 on the basis of the frame data DF of the clipboard 53A. This makes it possible for the user to design the label 9c to be printed while noticing the label region R1, etc. owing to the displayed frames F1 to F3.

The print data generating unit 108 illustrated in FIG. 5 may generate the print data DP on the basis of the spooled file supplied from the application software 102. The print data DP may be data written in a page description language (PDL), for example, in the present example embodiment. Upon generating the print data DP, the print data generating unit 108 may delete data on the frames F1 to F3 when the data based on the spooled file includes the data on the flames F1 to F3. Further, the print data generating unit 108 may supply the generated print data DP to the image forming apparatus 1.

The label region R1 may correspond to a "first region" in one specific but non-limiting embodiment of the invention. The frame F1 may correspond to a "first frame" in one specific but non-limiting embodiment of the invention. The printable region R2 may correspond to a "second region" in one specific but non-limiting embodiment of the invention.

The frame F2 may correspond to a "second frame" in one specific but non-limiting embodiment of the invention. The printing region R3 may correspond to a "third region" in one specific but non-limiting embodiment of the invention. The frame F3 may correspond to a "third frame" in one specific but non-limiting embodiment of the invention. The print medium 9 may correspond to a "print medium" in one specific but non-limiting embodiment of the invention. The region determined by the width of sheet and the length of sheet may correspond to a "medium region" in one specific but non-limiting embodiment of the invention. The CD-ROM 5 may correspond to a "recording medium" in one specific but non-limiting embodiment of the invention. The processor 51 may correspond to a "processor" in one specific but non-limiting embodiment of the invention.

[Operation and Workings]

Next, a description is given of operation and workings of the host computer 2 and the image forming apparatus according to the present example embodiment.

(Outline of Overall Operation)

First, referring to FIGS. 1 to 6, a description is given of an outline of overall operation of the host computer 2 and the image forming apparatus 1. First, the user interface unit 104 of the printer driver 103 illustrated in FIG. 5 may cause the screen 110 illustrated in FIG. 6 to be displayed on the display 61 on the basis of the operation performed by the user. Further, the user may input the size of sheet and margins using the sheet size input part 113, and may also input an additional coloring amount using the additional coloring amount input part 114. Further, in response to operation of the user performed on the copy button 115, the frame data generating unit 106 may generate the frame data DF on the basis of the result of the setting set using the screen 110, and the frame data transferring unit 107 may transfer the generated frame data DF to the clipboard 53A. Further, in response to the so-called paste operation performed by the user the application software 102 may cause the frames F1 to F3 to be displayed on the display screen of the display 61 on the basis of the frame data DF on the clipboard 53A. The user may design the label 9c to be printed while noticing the label region R1, etc., owing to the displayed frames F1 to F3. Upon designing the label 9c, the user may perform designing not in the label region R1 surrounded by the frame F1 but in the printing region R3 that is surrounded by the frame F3 and is larger than the label region R1.

Further, when the user finishes designing the label 9c and gives printing instructions by operating the application software 102, the application software 102 may generate the spooled file on the basis of the data of the designed label 9c, and supply the generated spooled file to the printer driver 103 via the operating system 101. The print data generating unit 108 of the printer driver 103 may generate the print data DP on the supplied spooled file, and supply the generated print data DP to the image forming apparatus 1.

In the image forming apparatus 1, on the basis of the print data DP, the exposure unit 29K and the ID unit 20K may form the black toner image, the exposure unit 29Y and the ID unit 20Y may form the yellow toner image, the exposure unit 29M and the ID unit 20M may form the magenta toner image, and the exposure unit 29C and the ID unit 20C may form the cyan toner image. The four transferring rollers 31 may transfer, onto the print medium 9, the respective toner images generated on the photosensitive members 21 of the four ID units 20. The fixing unit 40 may fix the toner image on the print medium 9. Further, the cutter 18 may cut out a piece having a shape based on the frame F, of the label sheet 9a.

(Detailed Operation)

Figure 9:
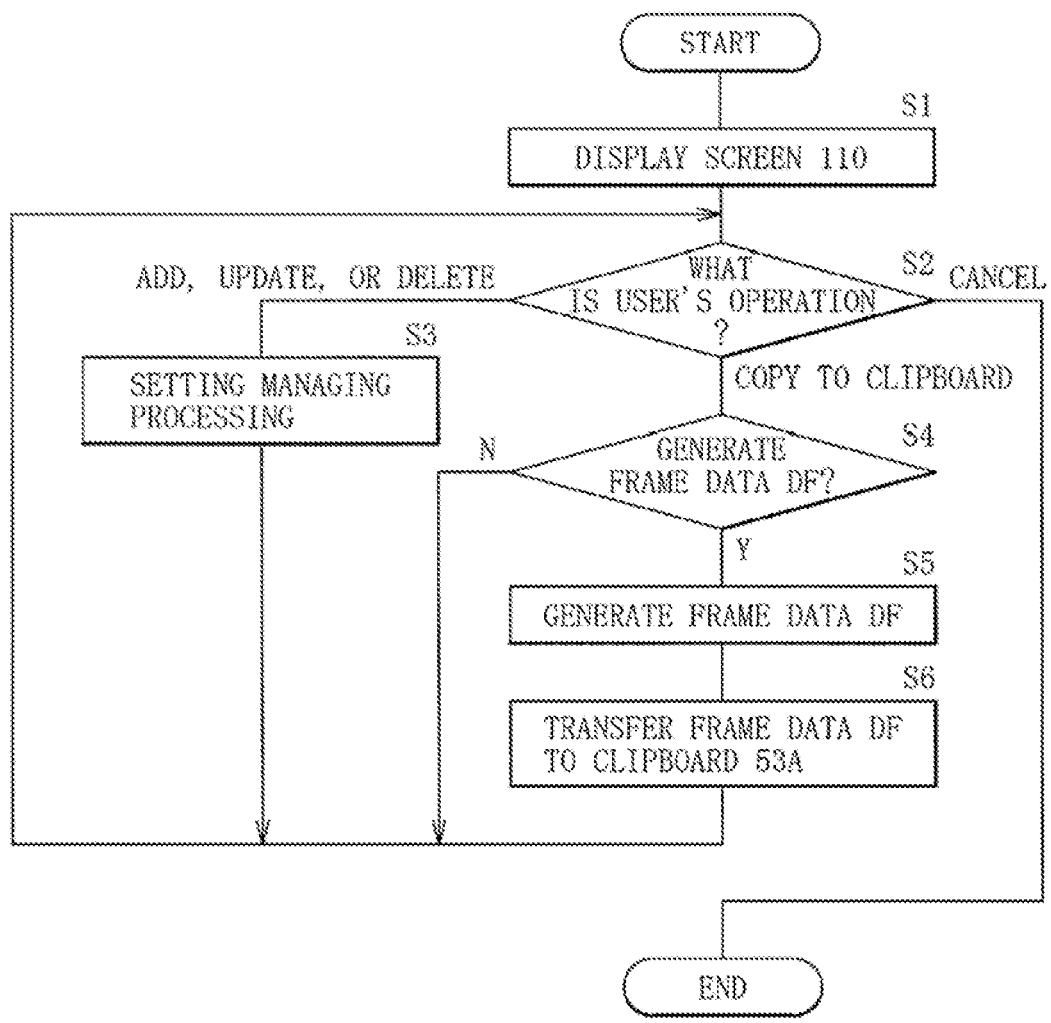
FIG. 9 is a flowchart illustrating an operation example of the host computer illustrated in FIG. 5.

FIG. 9 illustrates an operation example of the printer driver 103 of the host computer 2. The printer driver 103 may receive the operation performed by the user via the screen 110 illustrated in FIG. 6. This operation is described below in detail.

First, the user interface unit 104 causes the screen 110 illustrated in FIG. 6 to be displayed on the display screen of the display 61 on the basis of the operation performed by the user (step S1). Further, the user interface unit 104 receives the operation performed by the user.

Thereafter, the user interface unit 104 determines the operation performed by the user (step S2).

When the user operates one of the addition button 116, the update button 117, and the delete button 118 in step S2 ("add, update, or delete" in step S2), the setting managing unit 105 performs setting managing processing (step S3). More specifically, for example, when the user operates the addition button 116, the setting managing unit 105 adds a new setting to the database. Alternatively, when the user operates the update button 117, the setting managing unit 105 updates the setting that has been already registered. Alternatively, when the user operates the delete button 118, the setting managing unit 105 deletes, from the database, the setting selected by the user using the setting selection part 111.

Alternatively, when the user operates the copy button 115 in step S2 ("copy to clipboard" in step S2), the frame data generating unit 106 determines whether to generate the frame data DF (step S4). More specifically, the frame data generating unit 106 may determine to generate the frame data DF when the four values inputted by the user using the additional coloring amount input part 114 are larger than zero, for example.

When the frame data generating unit 106 determines to generate the frame data DF in step S4 ("Y" in step S4), the frame data generating unit 106 generates the frame data DF on the basis of the result of the setting set using the screen 110 (step S5), and the frame data transferring unit 107 transfers the generated frame data DF to the clipboard 53A (step S6). Further, the process returns to step S2. This causes the user interface unit 104 to receive next operation performed by the user. Alternatively, when the frame data generating unit 106 determines not to generate the frame data DF in step S4 ("N" in step S4), the process returns to step S2. This causes the user interface unit 104 to receive next operation performed by the user.

Alternatively, when the user operates the cancel button 119 ("cancel" in step S2) the user interface unit 104 may terminate displaying of the screen 110. This brings the flow to the end.

As described in steps S5 and S6, in response to the operation of the user performed on the copy button 115, the frame data generating unit 106 may generate the frame data DF on the basis of the result of the setting set using the screen 110, and the data transferring unit 107 may transfer the frame data DF to the clipboard 53A. Further, in response to the so-called paste operation performed by the user, the application software 102 may cause the frames F1 to F3 to be displayed on the basis of the frame data DF on the clipboard 53A.

Figure 10A:
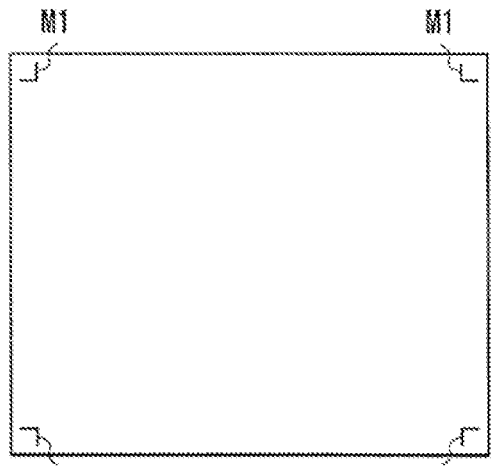
FIG. 10A is a diagram for explaining an operation example of the host computer illustrated in FIG. 5.
Figure 10B:
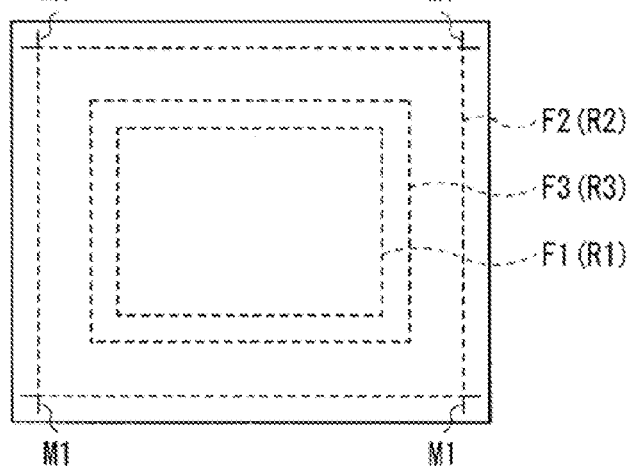
FIG. 10B is another diagram for explaining the operation example of the host computer illustrated in FIG. 5.
Figure 10C:
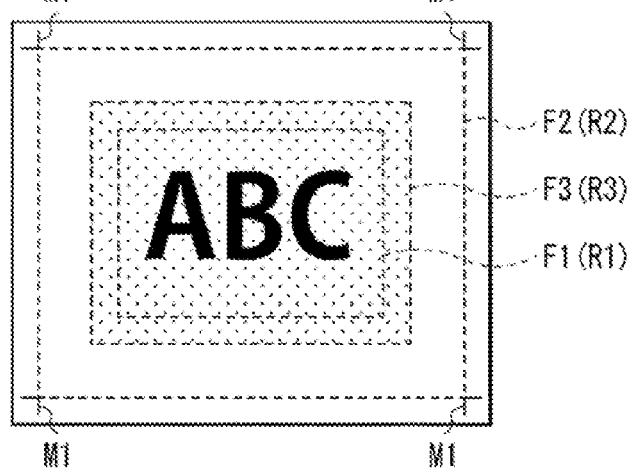
FIG. 10C is still another diagram for explaining the operation example of the host computer illustrated in FIG. 5.

FIGS. 10A to 10C may illustrate display examples caused to be displayed by the application software 102. FIG. 10A illustrates the display example before the frames F1 to F3 are displayed. FIG. 10B illustrates the display example while the frames F1 to F3 are displayed. FIG. 10C illustrates the display example when the user has finished designing the label 9c. An outermost frame illustrated in each of FIGS. 10A to 10C indicates the size of sheet.

The present example embodiment may have a configuration in which the application software 102 may make an inquiry to the printer driver 103 in response to the operation performed by the user, before the frames F1 to F3 are displayed, to thereby acquire information about the size of the printable region R2. Further, referring to FIG. 10A, the application software 102 may provide crop marks ML indicating the printable region R2 in the vicinities of four corners, in accordance with the acquired information about the size of the printable region R2.

Thereafter, for example, in response to the so-called paste operation performed by the user, the application software 102 may cause the flames F1 to F3 to be displayed on the basis of the frame data DF on the clipboard 53A. Further, the user may so move the frames F1 to F3 that the frame F2 is located to fit into the positions indicated by the crop marks M1 as illustrated in FIG. 10B. The positions of the label region R1 and the printing region R3 in the sheet may be thus set.

Further, the user may design the label 9c to be printed taking into consideration the frames F1 to F3. Upon designing the label 9c, the user may perform designing not in the label region R1 surrounded by the frame F1 but in the printing region R3 that is surrounded by the frame F3 and is larger than the label region R1 as illustrated in FIG. 10C.

Further, when the user finishes designing the label 9c and operates the application software 102 to thereby give printing instructions, the application software 102 may generate the spooled file on the basis of the data of the designed label 9c, and supply the generated spooled file to the printer driver 103 via the operating system 101. The print data generating unit 108 of the printer driver 103 may generate the print data DP on the basis of the spooled file supplied from the application software 102. Upon generating the print data DP, the print data generating unit 108 may delete the data on the frames F1 to F3 when the data based on the spooled file includes the data on the frames F1 to F3. Further, the print data generating unit 108 may supply the generated print data DP to the image forming apparatus 1.

It is to be noted that the print data generating unit 108 deletes the data on the frames F1 to F3 in the present example embodiment. However, this is not limitative. Alternatively the user may delete the flames F1 to F3 while designing the label 9c through operating the application software 102.

The image forming apparatus 1 may perform printing on the print medium 9 on the basis of the foregoing print data DP, and cut out a piece having a shape based on the flame F1, of the label sheet 9a. The image forming apparatus 1 may thus produce the label 9c.

As described above, the host computer 2 may have the configuration in which the frame F1 surrounding the label region R1 is displayed. This makes it possible for the user to notice the size and the position of the label region R1 that is to be cut out by the cutter 18, making it possible for the user to take into consideration the size of the label region R1 while designing the label 9c. More specifically, for example, when the frame F1 is not displayed, the user may need to perform printing after designing, and revise the design on the basis of a result of the printing. This case may require repetition of design revision and actual printing, which may be troublesome for the user. In contrast, the host computer 2 may be configured to display the flame F1 surrounding the label region R1. This makes it possible for the user to take into consideration the size of the label region R1 while designing the label 9c. Hence, the host computer 2 may not require repetition of design revision and actual printing, which saves the user's effort and reduces sheets and ink used for trials. As a result, the host computer 2 allows for easier designing of the label 9c.

Moreover, the host computer 2 may have the configuration in which the frame F3 surrounding the printing region R3 is displayed. This makes it possible for the user to notice designing at least in which region allows for avoidance of occurrence of a non-printed region. More specifically, for example, when the position of the print medium 9 is shifted from a desired position thereof due to the accuracy, of the image forming apparatus 1, in conveying the print medium 9, the position of the label region R1 inside the printing region R3 may be shifted from a desired position thereof in some cases. Performing printing in the region (the printing region R3) that includes the label region R1 and is larger than the label region R1 allows for printing on the entire surface of the label 9c avoiding occurrence of the non-printed region in the label 9c, even in such a case. The configuration of the host computer 2 in which the frame F3 surrounding the printing region R3 is displayed makes it possible for the user to notice the size and the position of the printing region R3 to thereby perform designing in the printing region R3. As a result, the host computer 2 allows for easier designing of the label 9c.

Moreover, the host computer 2 may have the configuration in which the frame F2 surrounding the printable region R2 is displayed. This makes it possible for the user to utilize the frame F2 to move the frames F1 to F3 in the display screen of the application software 102, to thereby appropriately set the positions of the label region R1 and the printing region R3 in the sheet. As a result, the host computer 2 allows for easier designing of the label 9c.

[Effects]

According to the present example embodiment, the frame surrounding the label region is displayed, which makes it possible for the user to notice the size and the position of the label region as described above. This allows for easier designing of the label.

According to the present example embodiment, the frame surrounding the printing region is displayed, which makes it possible for the user to notice at least in which region the user should perform designing. This allows for easier designing of the label.

According to the present example embodiment, the frame surrounding the printable region is displayed, which makes it possible for the user to appropriately set the positions of the label region and the printing region. This allows for easier designing of the label.

According to one example embodiment, the frame data that includes the frame surrounding the label region and the marker that gives the instruction on setting the position of the frame surrounding the label region in the sheet is generated. This allows for easier designing of the image to be printed.

Modification 1-1

The foregoing example embodiment has the configuration in which the frame data generating unit 106 generates the frame F2 surrounding the printable region R2. However, this is not limitative. The frame F2 may be replaced by anything that is usable, on the display screen of the application software 102, for giving instructions on the positions of the label region R1 and the printing region R3 in the sheet. More specifically, a marker using which the origin provided at a predetermined position in the sheet is to be brought to coincide may be provided, for example.

Modification 1-2

The foregoing example embodiment has the configuration in which determination is made on whether to generate the frame data DF in step S4. However, step S4 may not be provided. In such a case, the frame data generating unit 106 may generate the frame data DF (step S5) irrespective of whether the four values inputted by the user using the additional coloring amount input part 114 are larger than zero. Further, the frame data transferring unit 107 may transfer the generated frame data DF to the clipboard 53A (step S6). When the four values inputted by the user using the additional coloring amount input part 114 are zero, the frame F1 and the frame F2 coincide with each other.

Modification 1-3

The foregoing example embodiment has the configuration in which factors such as the size of sheet and the additional coloring amount are set through operation of the user performed on the screen 110 illustrated in FIG. 6. However, the shape of the label region R1, i.e., the region shaded in FIG. 6 may be set in addition thereto. Further, factors such as the width and the color of each of the flames F1 to F3 may be set in addition thereto.

Modification 1-4

The foregoing example embodiment is described referring to the example using the label. However, this is not limitative. Alternatively, the invention is applicable also to general sheet. In other words, the invention is applicable to various cases in which marginless printing involves cutting out of the sheet.

Modification 1-5

The foregoing example embodiment has the configuration in which the screen 110 illustrated in FIG. 6 includes the additional coloring amount input part 114 to allow the frame F3 (the printing region R3) to be set on the basis of the values inputted by the user using the sheet size input part 113 and the additional coloring amount input part 114. However, this is not limitative. Alternatively, for example, the additional coloring amount input part 114 may not be provided, and the frame data generating unit 106 may generate the frame F3 that is larger than the frame F1 by a predetermined amount.

Modification 1-6

The foregoing example embodiment has the configuration in which the printer driver 103 may be recorded, for example, in the CD-ROM 5 to be distributed via the CD-ROM 5. However, this is not limitative. Alternatively, the printer driver 103 may be distributed via a recording medium such as a CD-R, a CD-RW, a DVD-ROM, and a USB memory. Alternatively, the printer driver 103 may be distributed via the Internet.

2. SECOND EXAMPLE EMBODIMENT

Next, a description is given of a host computer 3 on which a printer driver according to a second example embodiment is installed. The present example embodiment is different from the foregoing first example embodiment in a method of presenting information about the frames F1 to F3 to the user. More specifically, the frames F1 to F3 may be displayed on the display 61 according to the foregoing first example embodiment. However, the present example embodiment may have a configuration in which an image including the frames F1 to F3 is outputted as a portable document format (PDF) file. It is to be noted that the component parts that are substantially the same as those of the host computer 2 according to the foregoing first example embodiment are denoted with the same numerals, and will not be further described where appropriate.

Figure 11:
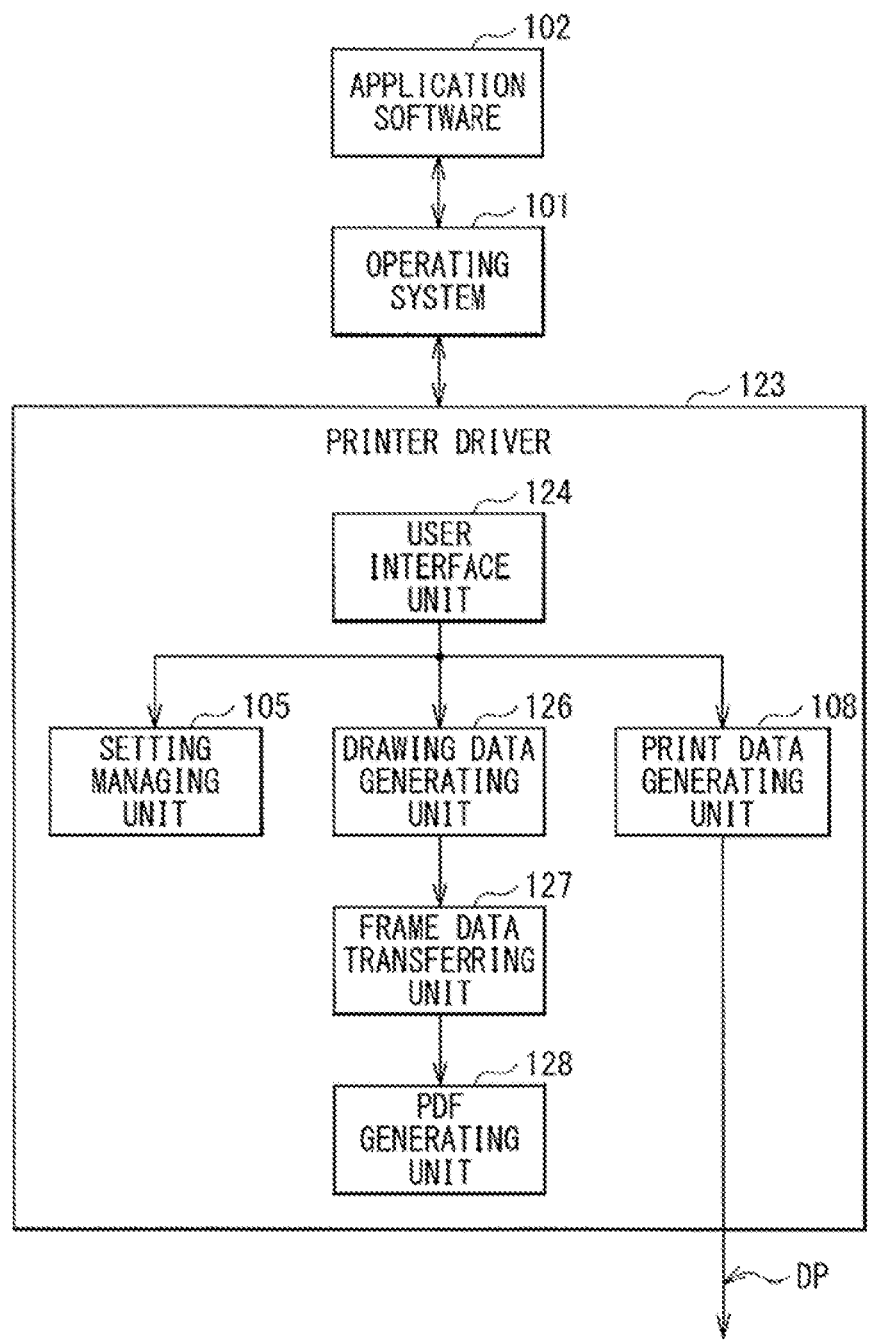
FIG. 11 is a diagram for explaining an example of a software configuration of a host computer according to a second example embodiment.

FIG. 11 illustrates an example of a software configuration of the host computer 3. The host computer 3 may be provided with a printer driver 123 installed thereon.

The printer driver 123 may include a user interface unit 124, a drawing data generating unit 126, a frame data generating unit 127, and a PDF generating unit 128.

The user interface unit 124 may cause the printing setting screen to be displayed on the display 61 of the host computer 3 as with the user interface unit 104 according to the first example embodiment. The printing setting screen may be a GUI. The user interface unit 124 may also perform various types of printing setting in response to reception of the instructions given by the user via the keyboard 62 and the mouse 63.

Figure 12:
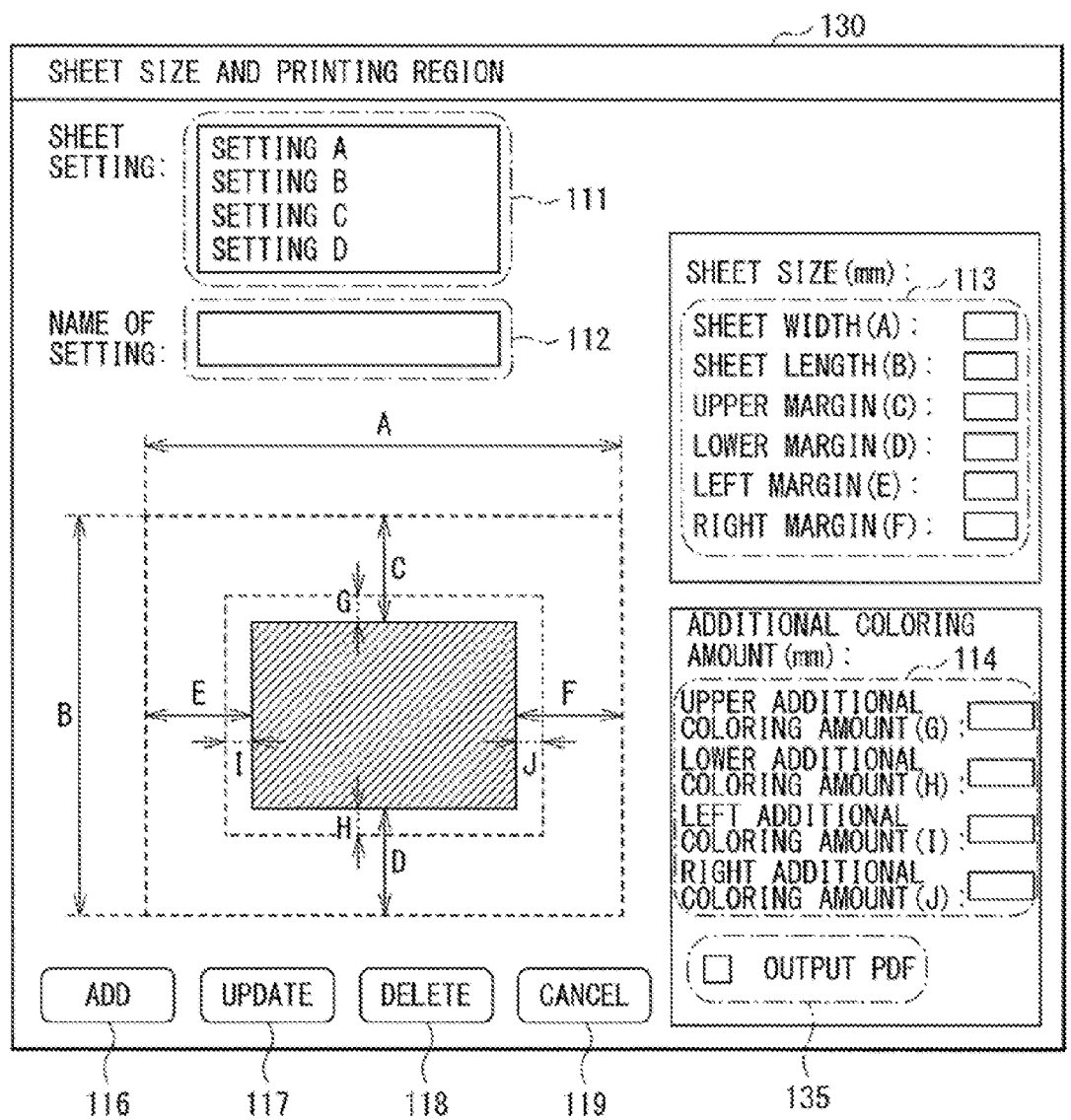
FIG. 12 is a diagram for explaining an example of a screen according to a printer driver illustrated in FIG. 11.

FIG. 12 illustrates an example of a screen 130 that is used to set the size of sheet and the printing region. The screen 130 may include a PDF output setting part 135. The PDF output setting part 135 may be provided to generate the frame data DF on the basis of the result of the setting, and generate the PDF file on the basis of the generated frame data DF. In the present example embodiment, the PDF output setting part 135 may be a checkbox. When the user gives printing instructions after checking the checkbox, the printer driver 123 may generate the PDF file.

The drawing data generating unit 126 may generate drawing data of the label 9c designed by the user, on the basis of the spooled file supplied from the application software 102.

The frame data generating unit 127 may generate the frame data DF on the basis of the result of the setting set using the screen 130 illustrated in FIG. 12 as with the frame data generating unit 106 according to the first example embodiment, when the user gives instructions to generate the PDF file using the PDF output setting pan 135 in the screen 130.

The PDF generating unit 128 may generate the PDF file on the basis of the drawing data generated by the drawing data generating unit 126 and the frame data DF generated by the frame data generating unit 127.

Figure 13:
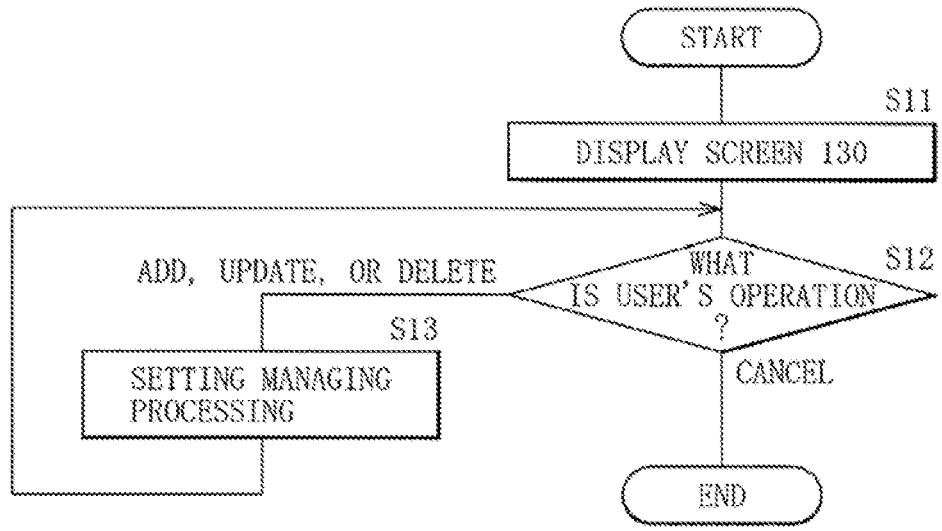
FIG. 13 is a flowchart illustrating an operation example of the host computer illustrated in FIG. 11.

FIG. 13 illustrates an operation example of the printer driver 123 of the host computer 3. First, the user interface unit 124 causes the screen 130 illustrated in FIG. 12 to be displayed on the display screen of the display 61, on the basis of operation performed by the user (step S11). Further, the user interface unit 124 receives operation performed by the user. Thereafter, the user interface unit 124 determines the operation performed by the user (step S12).

When the user operates one of the addition button 116, the update button 117, and the delete button 118 in step S12 ("add, update, or delete" in step S12), the setting managing unit 105 performs setting managing processing (step S13). The setting managing unit 105 operates in a manner similar to that of the setting managing unit 105 according to the first example embodiment. Upon performing the setting managing processing, when the user gives instructions to generate the PDF file using the PDF output setting part 135, the setting managing unit 105 may reflect, to the database, the setting including the generation of the PDF file.

Further, when the user operates the cancel button 119 in step S12 ("cancel" in step S12), the user interface unit 124 may terminate displaying of the screen 130. This brings the flow to the end.

Figure 14:
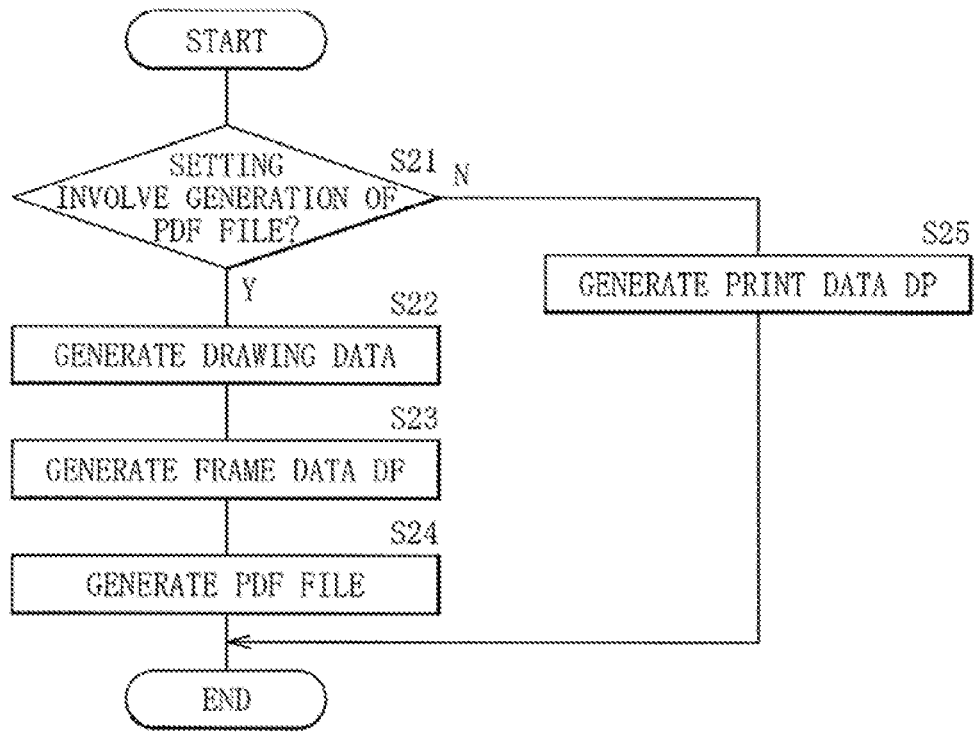
FIG. 14 is another flowchart illustrating the operation example of the host computer illustrated in FIG. 11.

FIG. 14 illustrates an operation example of the printer driver 123 in a case where the user gives the printing instructions. First, the PDF generating unit 128 confirms whether the setting involves generation of the PDF file (step S21). More specifically, the PDF generating unit 128 confirms whether the user has given instructions to generate the PDF file using the PDF output setting part 135 when performing printing setting using the screen 130 illustrated in FIG. 12.

When the PDF generating unit 128 confirms that the setting involves generation of the PDF file in step S21 ("Y" in step S21) the drawing data generating unit 126 generates the drawing data of the label 9c designed by the user, on the basis of the spooled file supplied from the application software 102 (step S22). Thereafter, the frame data generating unit 127 may generate the frame data DF on the basis of the result of the setting set using the screen 130 illustrated in FIG. 12 (step S23). Further, the PDF generating unit 128 generates the PDF file on the basis of the drawing data that has been generated by the drawing data generating unit 126 in step S22 and the frame data DF that has been generated by the frame data generating unit 127 in step S23 (step S24).

Figure 15:
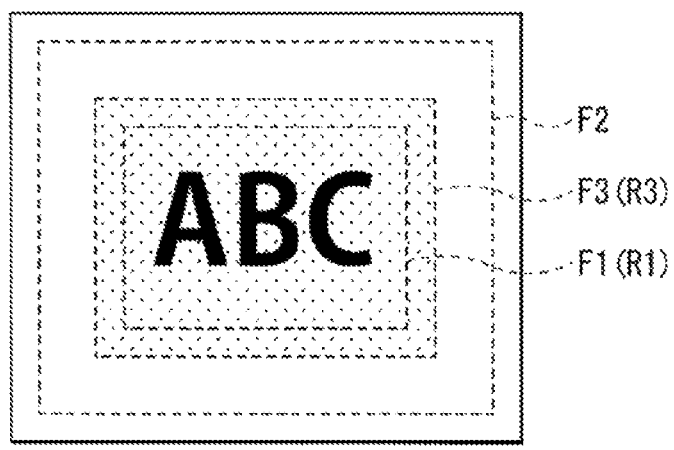
FIG. 15 is a diagram for explaining the operation example of the host computer illustrated in FIG. 11.

FIG. 15 illustrates an example of an image based on the PDF file. An outermost frame illustrated in FIG. 15 indicates the size of sheet. The PDF generating unit 128 may generate an image in which the image designed by the user and the frames F1 to F3 are overlaid on each other as illustrated in FIG. 15.

When the PDF generating unit 128 confirms that the setting does not involve generation of the PDF file in step S21 ("N" in step S21), the print data generating unit 108 generates the print data DP on the basis of the spooled file supplied from the application software 102.

This brings the flow to the end.

When the user thus gives instructions to generate the PDF file using the PDF output setting part 135 in the screen 130 illustrated in FIG. 12, the host computer 3 may generate the PDF file illustrated in FIG. 15. The user is allowed to confirm the generated PDF file to revise the design using the application software 102. Further, when the user gives thereafter instructions not to generate the PDF file using the PDF output setting part 135, the host computer 3 may generate the print data DP on the basis of the spooled file supplied from the application software 102 without generating the frame data DF. Further, the image forming apparatus 1 may perform printing on the print medium 9 on the basis of the generated print data DP and cut out a piece having a shape in accordance with the frame F1, of the label sheet 9a. This achieves production of the label 9c using the image forming apparatus 1.

As described above, the host computer 3 has the configuration in which the PDF file is generated on the basis of the spooled file supplied from the application software 102 and the frame data DF. This makes it possible for the user to confirm the image in which the image designed by the user and the frames F1 to F3 are overlaid on each other, before performing actual printing. This allows for avoidance of repetition of design revision and actual printing, achieving easier designing of the label 9c.

As described above, according to the present example embodiment, the PDF file is generated on the basis of the spooled file supplied from the application software and the frame data. This makes it possible for the user to confirm the image in which the image designed by the user and the frames are overlaid on each other, before performing actual printing. This allows for easier designing of the label. Other effects may be similar to those of the foregoing first example embodiment.

The invention has been described above with reference to some example embodiments and the modifications thereof. However, the invention is not limited to the foregoing embodiments and the foregoing modifications thereof, and is variously modifiable.

For example, cutting out is performed after printing according to the respective foregoing example embodiments and the modifications thereof. However, this is not limitative. Alternatively, a roll of sheet provided with perforations in advance may be used as the print medium 9.

Moreover, for example, the cutter 18 cuts out a quadrangle piece according to the respective foregoing example embodiments and the modifications thereof. However, this is not limitative. Alternatively, the cutter may cut out a piece having any shape such as an oval shape and a star-like shape.

Moreover, for example, the image forming apparatus 1 using the electrophotographic method is used according to the respective foregoing example embodiments and the modifications thereof. However, this is not limitative. Alternatively, an image forming apparatus using an inkjet method may be used, for example. Moreover the image forming apparatus 1 has a configuration that is allowed to form a color image. However, this is not limitative. However, for example, the image forming apparatus may have a configuration that is allowed to form a monochrome image.

Furthermore, the invention encompasses any possible combination of some or all of the various embodiments and the modifications described herein and incorporated herein.

It is possible to achieve at least the following configurations from the above-described example embodiments of the invention.

(1)

A recording medium having a printer driver embodied therein, the printer driver causing, when executed by a processor, the processor to implement a method, the method including:

receiving, with the processor, an input of information that includes an instruction on setting a first region, the first region being included in a medium region that corresponds to a print medium; and generating, with the processor, frame data that includes a first frame and an instruction marker, the first frame surrounding the first region, and the instruction marker being adapted to give an instruction on setting a position of the first frame in the medium region.

(2)

The recording medium according to (1), the method further including storing the frame data in a memory.

(3)

The recording medium according to (2), wherein the memory includes a clipboard.

(4)

The recording medium according to (1), the method further including performing image processing that causes an image based on image data created with application software and an image based on the frame data to be overlaid on each other.

(5)
The recording medium according to (4), the method further including generating a PDF file on a basis of a result of the image processing.

(6)
The recording medium according to any one of (1) to (5), wherein the instruction marker is a second frame that surrounds a second region, the second region being included in the medium region and being smaller than the medium region by a predetermined amount.

(7)
The recording medium according to (6), wherein the flame data further includes a third frame that surrounds a third region, the third region including the first region and being included in the second region.

(8)
The recording medium according to (7), the method further including receiving an input of information that includes an instruction on setting the third region.

(9)
The recording medium according to (7) or (8), the method further including generating print data on a basis of image data created with application software, wherein
a region of an image based on the image data includes at least the third region.

(10)
The recording medium according to any one of (1) to (9), wherein the first region has a shape that corresponds to a cutting shape of a piece that is to be cut out of the print medium.

(11)
The recording medium according to any one of (1) to (9), wherein
the print medium includes a mount sheet and a label sheet attached to the mount sheet, and
the first region has a shape that corresponds to a shape of a label that is to be cut out of the label sheet.

(12)
An information processing unit, including
a processor that receives an input of information that includes an instruction on setting a first region, and generates frame data that includes a first frame and an instruction marker, the first region being included in a medium region that corresponds to a print medium the first frame surrounding the first region, and the instruction maker being adapted to give an instruction on setting a position of the first frame in the medium region.

(13)
A printer driver causing a processor to implement a method, the method including:
receiving an input of information that includes an instruction on setting a first region, the first region being included in a medium region that corresponds to a print medium; and
generating frame data that includes a first frame and an instruction marker, the first frame surrounding the first region, and the instruction marker being adapted to give an instruction on setting a position of the first frame in the medium region.

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A non-transitory recording medium having a printer driver embodied therein, the printer driver causing, when executed by a hardware processor, the hardware processor to implement a method, the method comprising:
receiving, with the hardware processor, an input of information that includes an instruction on setting a first region, the first region being included in a medium region that corresponds to a print medium;
receiving, with the hardware processor, an instruction on whether to generate frame data that includes a first frame and an instruction marker, the first frame surrounding the first region, and the instruction marker being adapted to give an instruction on setting a position of the first frame in the medium region; and
generating, with the hardware processor, the frame data when an instruction on generation of the frame data is received.

2. The non-transitory recording medium according to claim 1, wherein the method further comprises storing the frame data in a memory.

3. The non-transitory recording medium according to claim 2, wherein the memory includes a clipboard.

4. The non-transitory recording medium according to claim 1, wherein the method further comprises performing image processing that causes an image based on image data created with application software and an image based on the frame data to be overlaid on each other.

5. The non-transitory recording medium according to claim 4, wherein the method further comprises generating a PDF file on a basis of a result of the image processing.

6. The non-transitory recording medium according to claim 1, wherein the instruction marker is a second frame that surrounds a second region, the second region being included in the medium region and being smaller than the medium region by a predetermined amount.

7. The non-transitory recording medium according to claim 6, wherein the frame data further includes a third frame that surrounds a third region, the third region including the first region and being included in the second region.

8. The non-transitory recording medium according to claim 7, wherein the method further comprises receiving an input of information that includes an instruction on setting the third region.

9. The non-transitory recording medium according to claim 7, wherein the method further comprises generating print data on a basis of image data created with application software, and wherein
a region of an image based on the image data includes at least the third region.

10. The non-transitory recording medium according to claim 1, wherein the first region has a shape that corresponds to a cutting shape of a piece that is to be cut out of the print medium.

11. The non-transitory recording medium according to claim 1, wherein
   the print medium includes a mount sheet and a label sheet attached to the mount sheet, and
   the first region has a shape that corresponds to a shape of a label that is to be cut out of the label sheet.

12. An information processing unit, comprising
   a hardware processor that receives an input of information that includes an instruction on setting a first region, receives an instruction on whether to generate frame data that includes a first frame and an instruction marker, and generates the frame data when an instruction on generation of the frame data is received, the first region being included in a medium region that corresponds to a print medium, the first frame surrounding the first region, and the instruction marker being adapted to give an instruction on setting a position of the first frame in the medium region.

* * * * *